US010689553B2

(12) United States Patent
Tsuno et al.

(10) Patent No.: US 10,689,553 B2
(45) Date of Patent: Jun. 23, 2020

(54) MOISTURE-CURABLE HOT MELT ADHESIVE FOR LIGHTING APPLIANCES

(71) Applicant: Henkel AG & Co. KGaA, Duesseldorf (DE)

(72) Inventors: Shingo Tsuno, Kanagawa (JP); Masaaki Dobashi, Yokohama (JP); Takahide Morishita, Osaka (JP); Tomonori Takahashi, Tokyo (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 609 days.

(21) Appl. No.: 15/242,012

(22) Filed: Aug. 19, 2016

(65) Prior Publication Data
US 2016/0355713 A1 Dec. 8, 2016

Related U.S. Application Data

(63) Continuation of application No. PCT/JP2015/054509, filed on Feb. 12, 2015.

(30) Foreign Application Priority Data

Feb. 28, 2014 (JP) .................................. 2014-39780

(51) Int. Cl.
C09J 175/08 (2006.01)
C08G 18/40 (2006.01)
C08G 18/48 (2006.01)
C08G 18/42 (2006.01)
C08G 18/62 (2006.01)
C09J 139/06 (2006.01)
C09J 133/10 (2006.01)
C09J 175/04 (2006.01)
C08L 33/00 (2006.01)
C08L 75/04 (2006.01)

(52) U.S. Cl.
CPC ........ *C09J 175/08* (2013.01); *C08G 18/4018* (2013.01); *C08G 18/4063* (2013.01); *C08G 18/42* (2013.01); *C08G 18/4808* (2013.01); *C08G 18/4833* (2013.01); *C08G 18/6225* (2013.01); *C08L 33/00* (2013.01); *C08L 75/04* (2013.01); *C09J 133/10* (2013.01); *C09J 139/06* (2013.01); *C09J 175/04* (2013.01); *C08G 2170/20* (2013.01)

(58) Field of Classification Search
None
See application file for complete search history.

(56) References Cited

U.S. PATENT DOCUMENTS

| 3,743,626 | A | * | 7/1973 | Emmons | ............... | C07D 263/04 |
| | | | | | | 428/355 N |
| 5,470,945 | A | * | 11/1995 | Markle | ............... | C08G 18/2815 |
| | | | | | | 525/195 |
| 5,472,785 | A | | 12/1995 | Stobbie, IV et al. | | |
| 5,618,904 | A | * | 4/1997 | Martin | ............... | C08G 18/3215 |
| | | | | | | 528/73 |
| 5,631,318 | A | * | 5/1997 | Ito | ............... | C08G 18/10 |
| | | | | | | 524/590 |
| 5,942,302 | A | * | 8/1999 | Ha | ............... | G11B 7/24 |
| | | | | | | 369/283 |
| 6,133,398 | A | * | 10/2000 | Bhat | ............... | C08G 18/10 |
| | | | | | | 523/211 |
| 6,498,210 | B1 | * | 12/2002 | Wang | ............... | C08G 18/10 |
| | | | | | | 156/329 |
| 6,749,943 | B1 | * | 6/2004 | Tangen | ............... | C08G 18/12 |
| | | | | | | 428/355 R |
| 8,324,340 | B2 | | 12/2012 | Burckhardt et al. | | |
| 8,349,123 | B2 | | 1/2013 | Zhang et al. | | |
| 8,715,831 | B2 | | 5/2014 | Wakamatsu | | |
| 2003/0008970 | A1 | * | 1/2003 | Rumack | ............... | C08G 18/12 |
| | | | | | | 524/589 |
| 2007/0117902 | A1 | * | 5/2007 | Origuchi | ............... | C08F 283/00 |
| | | | | | | 524/457 |
| 2007/0276115 | A1 | * | 11/2007 | Ou | ............... | C08G 18/3206 |
| | | | | | | 528/44 |
| 2008/0058492 | A1 | * | 3/2008 | Griswold | ............... | C08G 18/289 |
| | | | | | | 528/60 |
| 2010/0152394 | A1 | | 6/2010 | Slark et al. | | |
| 2013/0345354 | A1 | | 12/2013 | Tamogami et al. | | |
| 2015/0259465 | A1 | * | 9/2015 | Burckhardt | ............ | C08G 18/10 |
| | | | | | | 428/423.1 |

FOREIGN PATENT DOCUMENTS

JP H05117619 A 5/1993
JP H06108030 A 4/1994
(Continued)

OTHER PUBLICATIONS

The acrylic ester catalog by Mitsubishi Rayon Co., Ltd. (1997 edition); and "Shin Kobunshi Bunko (New Polymer Library in Japanese) 7, Toryo-yo Gouseijushi Nyumon (Introduction to Synthetic Resin for Coating Material in Japanese)", by Kyozo Kitaoka, Kobunshi Kankokai (Polymer Publishing Society in Japanese), published in 1997, pp. 168-169.

International Search Report for International PCT Patent Application No. PCT/JP2015/054509 dated May 26, 2015.

Primary Examiner — Christopher M Rodd

(74) Attorney, Agent, or Firm — James E. Piotrowski

(57) ABSTRACT

An object of the present invention is to provide a moisture-curable hot melt adhesive which can substantially suppress generation of carbon dioxide bubbles by a reaction of an isocyanate compound and moisture as well as volume expansion when an uncured adhesive is heated. The present invention relates to a moisture-curable hot melt adhesive for lighting appliances comprising: an urethane prepolymer obtained by mixing a polyol compound and an isocyanate compound, a thermoplastic polyacrylic resin and an oxazolidine compound.

16 Claims, No Drawings

(56) References Cited

FOREIGN PATENT DOCUMENTS

| | | | |
|---|---|---|---|
| JP | H08245940 A | | 9/1996 |
| JP | H09286837 A | | 11/1997 |
| JP | H09328668 A | * | 12/1997 |
| JP | H09328668 A | | 12/1997 |
| JP | H10500708 A | | 1/1998 |
| JP | 2004323660 A | | 11/2004 |
| JP | 2011518239 A | | 6/2011 |
| JP | 2012054188 A | | 3/2012 |
| JP | 2012241182 A | | 12/2012 |
| WO | 2008052999 A1 | | 5/2008 |
| WO | WO-2014040922 A1 | * | 3/2014 ........... C08G 18/222 |

* cited by examiner

MOISTURE-CURABLE HOT MELT ADHESIVE FOR LIGHTING APPLIANCES

TECHNICAL FIELD

The present invention relates to a moisture-curable hot melt adhesive for lighting appliances, particularly a moisture-curable hot melt adhesive for lighting appliances which can be prevented from volume expansion and sagging when a lens part of a lighting appliance is joined with a housing part thereof.

BACKGROUND ART

A rubber-based hot melt adhesive and a hot-melt adhesive made of a thermoplastic resin have been utilized in applications requiring sealing properties, in various fields such as motor vehicles and electronic materials. Further, a moisture-curable hot melt adhesive has been utilized for adhesion of a seat, an outer skin and the like as an adhesive having high and permanent adhesive properties and flexibility.

Although the moisture-curable hot melt adhesive is used also for a sealing application as an adhesive having high adhesive properties and flexibility, very long curing time has been required because when an uncured adhesive is heated, generation of bubbles due to decarboxylation by a reaction of an isocyanate and moisture as well as expansion will occur. Long curing time is not desirable in terms of inspection and product assurance and has been a hindrance to inspection and shipment.

An inner case and an outer case, a lens and a housing of a lighting appliance and the like are bonded with an adhesive and then subjected to an airtight test. The airtight test is important to verify proper sealing, and is performed immediately after adhesion in many cases. Therefore, a hot melt adhesive for sealing application is required to develop strength by solidification after coating. There has been a problem that a conventional moisture-curable urethane-based hot melt adhesive does not have sufficient early strength by solidification, and bubbles are generated from decarboxylation by a reaction of an isocyanate and moisture as described above when an uncured adhesive is heated.

Patent Literature 1 discloses a reactive hot melt adhesive prepared by blending a blocked isocyanate compound with a modified block polymer in which carboxyl group or acid anhydride group is introduced into a block polymer composed of a polystyrene block (A) and a poly-conjugated diene block or a block of a hydrogenated product thereof (B). However, since the reactive hot melt adhesive in Patent Literature 1 is synthesized by a reaction between an isocyanate and carboxyl group after dissociation of the blocking agent, generation of carbon dioxide is anticipated, and reduction of bubbles required for an adhesive to be used for sealing application cannot be achieved.

Patent Literature 2 describes a moisture-curable hot melt composition containing an isocyanate-terminated polyurethane prepolymer which is a reaction product of crystalline polyester polyol and polyisocyanate, and reactive wax. However, the moisture-curable hot melt adhesive described in Patent Literature 2 cannot suppress sagging, and generation of bubbles and volume expansion by a reaction of an isocyanate and moisture when an uncured adhesive is heated to high temperatures.

In recent years, there has been desired a urethane-based moisture-curable hot melt adhesive for lighting appliances which has rapid-curability and solves the problem of bubble-generation caused by heating the uncured adhesive, and the development thereof has become an urgent requirement.

CITATION LIST

Patent Literature

Patent Literature 1: Japanese Patent Laid-Open No. H6(1994)-108030
Patent Literature 2: Japanese Patent Laid-Open No. H10 (1998)-500708

SUMMARY OF INVENTION

Technical Problem

An object of the present invention is to provide a moisture-curable hot melt adhesive which can substantially suppress generation of carbon dioxide bubbles by the reaction of an isocyanate compound and moisture as well as volume expansion when the uncured adhesive is heated.

Solution to Problem

As a result of intensive studies, the present inventor has surprisingly found that when a thermoplastic polyacrylic resin, an oxazolidine compound, and a urethane prepolymer are blended to form an moisture-curable hot melt adhesive, not only the volume expansion of the moisture-curable hot melt adhesive but the sagging of an uncured adhesive can be prevented, and thermal stability and initial adhesive strength (adhesive strength of an uncured adhesive which is cooled and solidified) are also improved, and these findings have led to the completion of the present invention.

The present invention and preferred embodiments of the present invention relate to the following matters.
1. A moisture-curable hot melt adhesive for lighting appliances comprising:
   a urethane prepolymer obtained by mixing a polyol compound and an isocyanate compound,
   a thermoplastic polyacrylic resin and
   an oxazolidine compound.
2. The moisture-curable hot melt adhesive for lighting appliances according to the above item 1, wherein the polyol compound comprises an acrylic polyol and a polyester polyol.
3. The moisture-curable hot melt adhesive for lighting appliances according to the above item 1 or 2, wherein the polyol compound comprises a polyoxyethylene-oxypropylene block copolymer diol.
4. The moisture-curable hot melt adhesive for lighting appliances according to any one of the above items 1 to 3, wherein the polyol compound comprises a polycaprolactone polyol.
5. The moisture-curable hot melt adhesive for lighting appliances according to any one of the above items 1 to 4, wherein the urethane prepolymer is partly silylated by a silane compound.
6. A lighting appliance obtained by using the moisture-curable hot melt adhesive for lighting appliances according to any one of the above items 1 to 5.
7. A vehicle comprising the lighting appliance according to the above item 6.

Advantageous Effects of Invention

The moisture-curable hot melt adhesive for lighting appliance according to the present invention is prevented from volume expansion, sagging, and effusion when the uncured adhesive is heated, and is also excellent in thermal stability and initial adhesive strength.

DESCRIPTION OF EMBODIMENTS

A moisture-curable hot melt adhesive, preferably a moisture-curable hot melt adhesive for lighting appliances, according to the present invention contains a urethane prepolymer (A) obtained by mixing a polyol compound (a1) and an isocyanate compound (a2), a thermoplastic polyacrylic resin (B) and an oxazolidine compound (C). In the present specification, these components may be described as a component (a1), a component (a2), a component A, a component B, and a component C, respectively. Further, in the present specification, a moisture-curable hot melt adhesive may simply be described as a "hot melt adhesive" or an "adhesive."

Urethane Prepolymer (A)

The urethane prepolymer (A) contained in the moisture-curable hot melt adhesive of the present invention is obtained by mixing a polyol compound (a1) and an isocyanate compound (a2), has isocyanate group at a terminal, and is not particularly limited as long as it is commonly referred to as a urethane prepolymer.

Polyol Compound (a1)

In the present specification, the polyol compound is not particularly limited as long as a target urethane prepolymer can be obtained, and a known polyol used for common polyurethane production as a "polyol" can be used. A polyol having two or more hydroxy groups is desirable, and a diol which is a bifunctional polyol is particularly desirable. The polyols can be used singly or in combination of two or more. Note that in the present specification, a compound having an oxazolidine ring shall be classified into the component C and different from the component (a1).

The hydroxyl value (mg KOH/g) of the polyol compound is preferably 1 to 100 (mg KOH/g), more preferably 3 to 60 (mg KOH/g), but is not particularly limited thereto. The hydroxyl value can be determined according to ISO 4629.

The number average molecular weight of the polyol compound is preferably 1000 to 90000, more preferably 1000 to 50000, further preferably 1500 to 4000, but is not particularly limited thereto.

The number average molecular weight as used in the present specification means a value obtained by using gel permeation chromatography (GPC) using polystyrenes as the standard. For example, the number average molecular weight can be measured using the following GPC apparatus and measuring method. HCL-8220GPC manufactured by TOSOH CORP. is used as a GPC apparatus, and RI is used as a detector. As a GPC column, two pieces of TSKgel SuperMultipore HZ-M manufactured by TOSOH CORP. are used. A sample is dissolved in tetrahydrofuran and passed through the column at a flow rate of 0.35 ml/min and a column temperature of 40° C. to obtain a measured value of the number average molecular weight. The measured number average molecular weight is converted using a calibration curve in which polystyrenes having a monodisperse molecular weight are used as standard reference materials to obtain a target number average molecular weight. Values of the number average molecular weight are given in g/mol.

Examples of the "polyol" which can be used in the present invention include polyether polyol, polyester polyol, polycarbonate polyol, acrylic polyol, and polycaprolactone polyol.

Examples of the polyether polyol include polypropylene glycol (PPG), polyethylene glycol (PEG), and polytetramethylene glycol (PTMG). The number average molecular weight of these polyols is preferably about 1500 to 4000, more preferably 1500 to 2500, further preferably about 2000, but is not limited thereto. Further, the polyol is preferably a diol, more preferably a diol having a number average molecular weight of about 1500 to 4000, further preferably a diol having a number average molecular weight of about 2000.

Further, a compound prepared by copolymerizing two or more polyether polyols may be used as a polyol compound, and examples thereof include polyoxyethylene-oxypropylene block copolymer diol. When the polyol compound includes the polyoxyethylene-oxypropylene block copolymer diol, the hydrophilic polyether main chain promotes a curing reaction of isocyanate and moisture to form a suitable film at room temperature, thereby improving the initial adhesive strength of a hot melt adhesive. The polyoxyethylene-oxypropylene block copolymer diol desirably has a number average molecular weight of about 1000 to 5000, and is desirably a diol having an ethylene oxide content of about 5 to 40% by weight.

In the present invention, the polyester polyol preferably has, but is not particularly limited to, a melting point of 80° C. or more, particularly preferably 80 to 125° C. Further, the polyester polyol is preferably a bifunctional polyester polyol, more preferably a bifunctional polyester polyol (polyester diol) having a melting point of 80 to 125° C. The use of a polyester polyol having a melting point in the range as described above provides a significant effect of suppressing the sagging (i.e. an uncured part is melted by heating and falls downward by gravity) and effusion (i.e. an uncured part comes out of the cured surface films or between adhesive interfaces by heating) of a hot melt adhesive.

In the present specification, the melting point refers to a value measured with a DSC (differential scanning calorimeter), which is not limited to the above polyester polyol. The difference between the amount of heat of a test sample and that of a reference material is measured with a differential scanning calorimeter to calculate the melting point of the test sample. Specifically, the peak top of an endothermic peak observed by increasing temperature from −10° C. to 150° C. at a rate of 10° C./min was defined as a melting point.

The polyester polyol can be obtained by, but not particularly limited to, reacting a polycarboxylic acid or an anhydride thereof with a polyol, and is preferably obtained by reacting a dicarboxylic acid or an anhydride thereof with a diol compound.

Examples of the polycarboxylic acid for constituting the polyester polyol include aromatic polycarboxylic acids such as phthalic acid (may be any of ortho-isomer, meta-isomer, and para-isomer), trimellitic acid and naphthalene dicarboxylic acid, and aliphatic carboxylic acids such as succinic acid, adipic acid, pimelic acid, suberic acid, and azelaic acid. Examples of the anhydrides of polycarboxylic acid include anhydrides of these aliphatic carboxylic acids. The polyol for constituting the polyester polyol is preferably aliphatic polyols, and examples thereof include ethylene glycol, 1,2-propylene glycol, 1,3-propylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, 3-methyl-1,5-pentanediol, 2-methyl-1,8-octanediol, 2,2-diethyl-1,3-propanediol, 2,2-diethyl-1,3-pentanediol, 2-ethyl-2-butyl-1,3-propanediol, 2,4-diethyl-1,5-pentanediol, 1,4-cyclohexanedimethanol, diethylene glycol, triethylene glycol, tetraethylene glycol, neopentyl glycol, trimethylolethane, trimethylolpropane, pentaerythritol. These may be used singly or in combination of two or more.

Among these, examples of the polyester polyol include a copolymer of succinic acid and 1,4-butanediol and a copolymer of succinic anhydride and 1,4-butanediol. Examples of commercially available products of high-melting point polyester polyol (polyester polyol preferably having a melting point of 80° C. or more) include Dynacoll (product name) available from Evonik Industries AG. The high-melting polyester polyol may be blended in an amount of 0% by weight, but is desirably blended in an amount of 5 to 40% by weight, and is further desirably blended in an amount of 10 to 20% by weight, based on the total weight of the hot melt adhesive. When the amount of blending is in a range as described above, the moisture-curable hot melt adhesive for lighting appliances of the present invention is excellent in thermal stability and hardly sags.

In the present invention, the "acrylic polyol" may be a homopolymer of one monomer or a copolymer of two or more monomers selected from (meth)acrylates each having hydroxy group. Further, the "acrylic polyol" may be a copolymer of a (meth)acrylate and "other polymerizable monomers". The hydroxy group of acrylic polyol reacts with isocyanate group. When the acrylic polyol is contained, the adhesive strength of the hot melt adhesive is increased, and a strong film is formed during curing. Herein, the "(meth)acrylate" as used in the present specification means the generic name of acrylates and methacrylates.

Examples of the "(meth)acrylates each having hydroxy group" include 2-hydroxyethyl (meth)acrylate, 2-hydroxypropyl (meth)acrylate, 3-hydroxypropyl (meth)acrylate, glycerin mono(meth)acrylate, and 4-hydroxybutyl acrylate.

The term "other polymerizable monomers" refers to "radically polymerizable monomers each having an ethylenic double bond" other than the "(meth)acrylates each having hydroxy group". Specific examples thereof include (meth)acrylic acid, methyl (meth)acrylate, ethyl (meth)acrylate, butyl (meth)acrylate, cyclohexyl (meth)acrylate, 2-ethylhexyl (meth)acrylate, dicyclopentanyl (meth)acrylate, isobornyl (meth)acrylate, styrene, and vinyltoluene.

Further, in the present invention, the polyol compound may comprise polycaprolactone polyol. When the polycaprolactone polyol is included, the compatibility of polyol components is increased; a tough cured film is obtained; and adhesion to a plastic resin such as polycarbonate is increased. The polycaprolactone polyol is produced by subjecting ε-caprolactone to ring opening polymerization in the presence of a catalyst.

The caprolactone polyol has a narrow molecular weight distribution and has shape retentivity when it is used for a urethane-based reactive hot melt adhesive agent, and thus, it is capable of suppressing the sagging of the hot melt adhesive. These polycaprolactone polyols desirably have a number average molecular weight of about 10000 to 80000. Further, the melting point is desirably about 50° C. to 130° C. The hydroxyl value is desirably 8 mgKOH/g or less, more desirably 5 mgKOH/g or less. Examples of commercially available polycaprolactone polyols include the CAPA series available from Perstorp Corporation.

In the hot melt adhesive of the present invention, the polyol compound preferably includes acrylic polyol and polyester polyol. In this case, the acrylic polyol and polyester polyol react with an isocyanate to produce a urethane prepolymer having isocyanate group at a terminal. Inclusion of acrylic polyol and polyester polyol as a polyol compound increases the effect of suppressing volume expansion when an uncured adhesive is heated.

As an embodiment of the present invention, the polyol compound preferably includes acrylic polyol, polyester polyol, and polyoxyethylene-oxypropylene block copolymer diol.

As an embodiment of the present invention, the polyol compound more preferably includes acrylic polyol, polyester polyol, and polycaprolactone polyol.

As an embodiment of the present invention, the polyol compound further preferably includes acrylic polyol, polyester polyol, polyoxyethylene-oxypropylene block copolymer diol, and polycaprolactone polyol.

Isocyanate Compound (a2)

In the present invention, an isocyanate compound (a2) is not particularly limited as long as a target urethane prepolymer can be obtained, and any isocyanate compound can be used as long as the compound is used for common polyurethane production. As the isocyanate compound, an isocyanate compound having 1 to 3 isocyanate groups in average per one molecule is preferred; a diisocyanate compound and a monoisocyanate compound are more preferred; and a diisocyanate compound is further preferred. The isocyanate compound may be used singly or in combination of two or more.

In the present invention, any of aromatic isocyanates, alicyclic isocyanates, and aliphatic isocyanates may be used, and one or more selected from aromatic isocyanates and alicyclic isocyanates are preferably used.

The term "aromatic isocyanate" as used in the present invention refers to an isocyanate compound having an aromatic ring, and the isocyanate group does not need to be directly bound to the aromatic ring. The aromatic ring may be a fused ring of two or more benzene rings.

Examples of the aromatic isocyanate include 4,4'-diphenylmethane diisocyanate (MDI), p-phenylene diisocyanate, m-phenylene diisocyanate, tolylene diisocyanate (TDI), and xylylene diisocyanate (XDI: OCN—$CH_2$—$C_6H_4$—$CH_2$—NCO).

These aromatic isocyanate compounds may be used singly or in combination, and most preferably include 4,4'-diphenylmethane diisocyanate (MDI). Since xylylene diisocyanate has an aromatic ring, it corresponds to aromatic isocyanate although isocyanate groups are not directly bound to the aromatic ring.

An alicyclic isocyanate refers to a compound which has a cyclic hydrocarbon chain, may have an open hydrocarbon chain, and does not have an aromatic ring. Isocyanate group may be directly bound to a cyclic hydrocarbon chain or to an optional open hydrocarbon chain.

Examples of the alicyclic isocyanate include 5-isocyanato-1-isocyanatomethyl-1,3,3-trimethylcyclohexane (isophorone diisocyanate), 1,3-bis(isocyanatomethyl)cyclohexane (hydrogenated xylylene diisocyanate), bis(4-isocyanatocyclohexyl)methane (hydrogenated diphenylmethane diisocyanate), and 1,4-diisocyanatocyclohexane. These alicyclic isocyanates may be used singly or in combination.

The aliphatic isocyanate refers to a compound which has an open hydrocarbon chain, isocyanate group being directly bound to the open hydrocarbon chain, does not have a cyclic hydrocarbon chain, and does not have an aromatic ring.

Examples of the aliphatic isocyanate include 1,4-diisocyanatobutane, 1,5-diisocyanatopentane, hexamethylene diisocyanate (HDI), 1,6-diisocyanato-2,2,4-trimethylhexane, and methyl 2,6-diisocyanatohexanoate (lysine diisocyanate).

In the present invention, the polyol compound and the isocyanate compound are allowed to react with each other in amounts such that the equivalent ratio of isocyanate group to hydroxy group (isocyanate group/hydroxyl group) is preferably 1.1 or more and 4.0 or less, more preferably 1.2 or more and 3 or less, further preferably 1.2 or more and 2.0 or less to form a urethane prepolymer (A) having isocyanate group at terminal(s). The equivalent ratio (molar ratio) of isocyanate groups to hydroxy groups (isocyanate group/hydroxyl group) can be calculated based on the hydroxyl value and the NCO content, wherein the hydroxyl value can be determined according to ISO 4629 and the NCO content can be determined according to ISO 11909.

Further, in the present invention, a part of the urethane prepolymer is silylated by the addition reaction of a silane compound. When a part of the urethane prepolymer is silylated by the addition reaction of a silane compound, adhesive properties are improved by the reaction of a silyl terminal with an adherend; generation of carbon dioxide by a reaction of an isocyanate and moisture during heating is suppressed; and a hot melt adhesive with low volume expansion can be prepared. Examples of the silane compound include aminosilane and isocyanate silane. In the case isocyanate silane is used, end(s) is silylated by the reaction between an isocyanate and polyol. In the case aminosilane is used, it adds to isocyanate group of the urethane prepolymer, and end(s) is silylated in a manner of end-capping. The aminosilane is preferably, but not particularly limited to, a secondary aminosilane. The reaction is easily controlled by using the secondary aminosilane because volatile matter due to residual monomer is not observed, and viscosity increase during addition reaction is small.

When a part of the urethane prepolymer is silylated using a silane compound, the amount of the silane compound blended is preferably, for example, 0.1 to 0.5% by weight in the total weight of the hot melt adhesive.

The content of the urethane prepolymer in the hot melt adhesive of the present invention is, but not particularly limited to, preferably 50 to 95% by weight, more preferably 55 to 90% by weight, further preferably 60 to 90% by weight. These values refer to the content of the urethane prepolymer in the hot melt adhesive relative to the total weight of the hot melt adhesive.

Thermoplastic Polyacrylic Resin (B)

The hot melt adhesive of the present invention contains thermoplastic polyacrylic resin (B), which increases the solidification speed. Further, when the hot melt adhesive of the present invention is used for lighting appliances, the effect of suppressing the sagging and effusion of the adhesive can be enhanced in an airtight test performed when the adhesive is in an uncured state before curing is completed. The thermoplastic polyacrylic resin does not react with an isocyanate in the urethane prepolymer, but can be present as a non-reactive resin component. Further, the thermoplastic polyacrylic resin is preferably used for a moisture-curable hot melt adhesive for lighting appliances because the resin is present as a non-reactive resin component in the urethane prepolymer, and thereby can suppress a reduction in thermal stability.

In the present invention, the thermoplastic polyacrylic resin (B) is preferably prepared by polymerizing (meth)acrylic acid and/or a (meth)acrylic acid derivative as a monomer. Herein, a resin having two or more hydroxy groups is classified into the polyol compound (a1) constituting the component A, and is different from the component (B). Further, in the present specification, "acrylic acid and methacrylic acid" and "acrylic acid derivatives and methacrylic acid derivatives" are generically referred to as "(meth)acrylic acid" and "(meth)acrylic acid derivatives", respectively.

Examples of the (meth)acrylic acid derivatives include (meth)acrylates, acrylamide, and acrylonitrile. Examples of the acrylates include alkyl (meth)acrylates such as ethyl acrylate, butyl acrylate, 2-ethylhexyl acrylate, cyclohexyl methacrylate, isononyl acrylate, methyl methacrylate and methyl acrylate, and glycidyl methacrylate.

In the present invention, the thermoplastic polyacrylic resin (B) may be a homopolymer prepared by polymerizing one monomer or a copolymer prepared by polymerizing two or more monomers, each monomer being selected from (meth)acrylic acid and (meth)acrylic acid derivatives as described above.

Further, the thermoplastic polyacrylic resin may be a compound copolymerized from those containing one or two or more of other copolymerizable monomers in combination. Examples of other copolymerizable monomers include monomers each having an ethylenic double bond other than (meth)acrylic acid and (meth)acrylic acid derivatives, for example, styrene and vinyl acetate.

In the present invention, the "thermoplastic polyacrylic resin" preferably has a glass transition temperature (Tg) of 80° C. to 120° C. When the glass transition temperature of the thermoplastic polyacrylic resin is 80° C. to 120° C., the moisture-curable hot melt adhesive has significantly reduced sagging and volume expansion when an uncured adhesive is heated. Further, the shape of the thermoplastic polyacrylic resin is preferably, but not particularly limited to, a solid bead-like resin. The bead-like thermoplastic polyacrylic resin has a sharp molecular weight distribution, which can prevent sagging of the adhesive during heating. In the present invention, the thermoplastic polyacrylic resin is particularly preferably a solid bead-like resin having a glass transition temperature of 80° C. to 120° C.

In order to design a thermoplastic polyacrylic resin having a desired Tg, the mixing ratio (parts by weight) of a monomer (a) to "other monomers (a')" is determined in consideration of the glass transition temperature of a homopolymer (hereinafter also referred to as "Tg of homopolymer") obtained when each monomer of the monomer (a) and other monomers (a') in a monomeric mixture is homopolymerized.

Specifically, the "Tg of thermoplastic polyacrylic resin" can be determined by calculation using a formula for computation (1) of the theoretical Tg of the thermoplastic polyacrylic resin.

$$1/Tg = C1/Tg1 + C2/Tg2 + \ldots + Cn/Tgn: \quad (1)$$

[In the formula (1), Tg represents the theoretical Tg of a thermoplastic polyacrylic resin; Cn represents the weight ratio of n-th monomer n contained in the monomer mixture; Tgn represents Tg of the homopolymer of the n-th monomer n; and n is a positive integer representing the number of the monomers which constitute a thermoplastic polyacrylic resin.]

A value described in a literature can be used as Tg of a homopolymer of a monomer. For example, the following literatures may be referred to as such a literature: The acrylic ester catalog by Mitsubishi Rayon Co., Ltd. (1997 edition); and "Shin Kobunshi Bunko (New Polymer Library in Japanese) 7, Toryo-yo Gouseijushi Nyumon (Introduction to Synthetic Resin for Coating Material in Japanese)", by Kyozo Kitaoka, Kobunshi Kankokai (Polymer Publishing Society in Japanese), published in 1997, pp. 168-169.

An example of the design of Tg of the thermoplastic polyacrylic resin as described above will be described below.

When cyclohexyl(meth)acrylate (hereinafter also referred to as "CHMA") which is a monomer having Tg of homopolymer of 83° C. is used as the monomer (a) and the proportion of CHMA contained in a monomeric mixture is 40 to 67 parts by weight, a monomer having Tg of homopolymer of 95° C. or more and a monomer having Tg of homopolymer of −50° C. or less, for example, are used as the "other monomers (a')" and, in this case, the proportions of the former monomer and the latter monomer contained in the monomeric mixture are 20 to 30 parts by weight and 13 to 30 parts by weight, respectively.

Specifically, a thermoplastic polyacrylic resin having a theoretical Tg of 10 to 60° C. can be obtained by using 40 to 67 parts by weight of CHMA having Tg of homopolymer of 83° C., 20 to 30 parts by weight of methyl methacrylate (hereinafter also referred to as "MMA", having Tg of homopolymer of 105° C.) and/or styrene (hereinafter also referred to as "St", having Tg of homopolymer of 100° C.) which is a monomer having Tg of homopolymer of 95° C. or more, and 13 to 30 parts by weight of 2-ethylhexyl acrylate (hereinafter also referred to as "2EHA", having Tg of homopolymer of −85° C.) and/or butyl acrylate (hereinafter also referred to as "BA", having Tg of homopolymer of −54° C.) which is a monomer having Tg of homopolymer of −50° C. or less as the "other monomers (a')" to form a monomeric mixture and then polymerizing the monomeric mixture.

Examples of the "monomer (a)" other than CHMA include methylcyclopentyl methacrylate. Examples of the "other monomers (a')" other than MMA and St include acrylamide (having Tg of homopolymer of 153° C.), acrylic acid (hereinafter also referred to as "AA", having Tg of homopolymer of 106° C.), methacrylic acid (hereinafter also referred to as "MAA", having Tg of homopolymer of 130° C.), acrylonitrile (having Tg of homopolymer of 100° C.) and maleic acid (having Tg of homopolymer of 130° C.). Examples of the "monomer having Tg of homopolymer of −50° C. or less" other than 2EHA and BA include dodecyl methacrylate (having Tg of homopolymer of −65° C.).

Herein, a value in the acrylic ester catalog by Mitsubishi Rayon Co., Ltd. (1997 edition) was used as the value of Tg of homopolymer of CHMA, and values described in "Shin Kobunshi Bunko (New Polymer Library in Japanese) 7, Toryo-yo Gouseijushi Nyumon (Introduction to Synthetic Resin for Coating Material in Japanese)", by Kyozo Kitaoka, Kobunshi Kankokai (Polymer Publishing Society in Japanese), published in 1997, pp. 168-169 were used as the values of Tg of homopolymer of MMA, St, 2EHA, BA, AA, MAA, acrylamide, acrylonitrile, maleic acid, and dodecyl methacrylate.

Examples of commercially available products of the thermoplastic polyacrylic resin include DIANAL available from Mitsubishi Rayon Co., Ltd.

In the hot melt adhesive of the present invention, the blending amount of the thermoplastic polyacrylic resin (B) is, but not particularly limited to, preferably 3 to 40% by weight, more preferably 5 to 30% by weight, based on the total mass of the hot melt adhesive.

Oxazolidine Compound (C)

In the present invention, the oxazolidine compound may have one or more oxazolidine rings, preferably 1 to 2 oxazolidine rings, in the molecule. Further, the molecular weight of the oxazolidine compound is desirably 200 or more also from the point of view of suppressing the volatilization during polymerization and use.

The oxazolidine compound functions as a latent curing agent of a urethane prepolymer because it reacts with water (moisture) in the air to undergo hydrolysis, and the oxazolidine ring produces secondary amino group and alcoholic hydroxyl group. When isocyanate group of the urethane prepolymer reacts with moisture, the prepolymer produces a urea bond and is cured, but at this time, carbon dioxide is also generated, and carbon dioxide bubbles are formed in a cured product, leading to problems such as deterioration of appearance, rupture of a cured product, and reduction in adhesive properties. However, when a mixture of the urethane prepolymer and the oxazolidine compound is exposed to moisture, the oxazolidine ring of the oxazolidine compound undergoes hydrolysis with moisture to reproduce secondary amino group and alcoholic hydroxyl group before isocyanate group reacts with moisture, and these active hydrogens react with isocyanate group to cure the prepolymer without generating carbon dioxide, thereby preventing foaming of the composition of the present embodiment by carbon dioxide. Further, since the hot melt adhesive of the present invention contains an oxazolidine compound, the volume change during heating is suppressed.

The oxazolidine compound may have a functional group other than an oxazolidine ring, and examples thereof include a urethane bond-containing oxazolidine compound, an ester group-containing oxazolidine compound, oxazolidine silyl ether, and a carbonate group-containing oxazolidine. These oxazolidine compounds are obtained by allowing hydroxy group of a compound having hydroxy group and an oxazolidine ring to react with isocyanate group of a polyisocyanate compound or carboxyl group of an organic carboxylic acid compound.

Suitable examples of the oxazolidine compound having a urethane bond include those obtained by using a compound having hydroxy group and an oxazolidine ring and an organic isocyanate compound so that the molar ratio (isocyanate group/hydroxy group) of the isocyanate group of the organic isocyanate compound to the hydroxy group of the compound having hydroxy group and an oxazolidine ring is in the range of 0.9 or more and 1.2 or less, preferably in the range of 0.95 or more and 1.05 or less and reacting these compounds in the presence or absence of an organic solvent at a temperature of 50° C. or more to 120° C. or less.

Specific examples of the compound having hydroxy group and an oxazolidine ring which can be used for the production of the above oxazolidine compound include 2-isopropyl-3-(2-hydroxyethyl)oxazolidine, 2-(1-methylbutyl)-3-(2-hydroxyethyl)oxazolidine, 3-(2-hydroxyethyl)-2-(1-methylbutyl)oxazolidine, and 2-phenyl-3-(2-hydroxyethyl)oxazolidine.

Examples of the organic isocyanate compound used for the synthesis of the oxazolidine compound having a urethane bond include substantially the same compounds as used for the synthesis of the urethane prepolymer as described above. Among these compounds, aliphatic polyisocyanate is preferred, and hexamethylene diisocyanate is particularly preferred, in terms of reducing the crystallinity of the urethane bond-containing oxazolidine compound to improve the workability of the hot melt adhesive.

The ester group-containing oxazolidine compound can be obtained by a reaction between the compound having hydroxy group and an oxazolidine ring and a lower alkyl ester of a dicarboxylic acid or a polycarboxylic acid.

The oxazolidine silyl ether can be obtained by a dealcoholization reaction between the compound having hydroxy group and an oxazolidine ring and an alkoxysilane such as trimethoxysilane, tetramethoxysilane, triethoxysilane, dimethoxydimethylsilane, vinyltrimetoxysilane, vinyltriethoxysilane, 3-glycidoxypropyltrimethoxysilane, and 3-glycidoxypropyltriethoxysilane.

The carbonate group-containing oxazolidine can be obtained by allowing the compound having hydroxy group and an oxazolidine ring to react with a carbonate such as diallyl carbonate using a polyvalaent alcohol such as diethylene glycol and glycerin.

All of these can be used singly or in combination of two or more.

Examples of commercially available products which can be used as an oxazolidine compound in the present invention include Hardener OZ and Hardener XP7179 available from Bayer AG, Incozol 3 and Incozol HP available from Incorez Ltd., and Zoldine MS Plus available from ANGUS CHEMICAL Company.

The content of the oxazolidine compound (C) in the hot melt adhesive of the present invention is, but not particularly limited to, preferably 0.01% by weight to 5% by weight, more preferably 0.1 to 2% by weight, based on the total weight of the hot melt adhesive. When the content of the oxazolidine compound is in the above range, significant viscosity increase of the moisture-curable hot melt adhesive is not observed, and carbon dioxide bubbles are suppressed.

A method for producing the moisture-curable hot melt adhesive of the present invention is not particularly limited as long as the polyol compound (a1), isocyanate compound (a2), thermoplastic polyacrylic resin (B), and oxazolidine compound (C) as described above are blended in the hot melt adhesive. Specifically, an oxazolidine compound may be mixed with a "urethane prepolymer" previously produced from the component (a1) and the component (a2); or the polyol compound (a1) and the thermoplastic polyacrylic resin (B) may be mixed, and thereto the isocyanate compound may be added, and thereto the oxazolidine compound may be further added; or all the compounds may be simultaneously added and mixed. Further, when compounds are mixed, the compounds may be optionally heated, and the heating temperature is preferably equal to or higher than the melting point or glass transition point of each resin. Further, a solvent compatible with each component may be optionally used.

The moisture-curable hot melt adhesive of the present invention has a melt viscosity at 120° C. of preferably 15,000 to 50,000 mPa·s, particularly preferably 16,000 to 35,000 mPa·s. The melt viscosity is a value measured with a rotational viscometer from Brookfield Company.

When the moisture-curable hot melt adhesive has a melt viscosity at 120° C. of 15,000 to 50,000 mPa·s, carbon dioxide bubbles as well as volume expansion can be suppressed, and initial sagging and effusion are easily suppressed.

The moisture-curable hot melt adhesive of the present invention may contain other additives as long as a moisture-curable hot melt adhesive targeted by the present invention can be obtained, and it is preferred that the additives do not affect the polyol and isocyanate compound which form a urethane prepolymer.

The additives may be added along with the polyol and isocyanate compound when the urethane prepolymer is polymerized, or may be added after the polyol and isocyanate compound are previously allowed to react with each other to polymerize the urethane prepolymer.

The additives are those commonly used for a moisture-curable hot melt adhesive and are not particularly limited as long as a moisture-curable hot melt adhesive targeted by the present invention can be obtained. Examples of such additives that can be added include an antioxidant, a plasticizer, an ultraviolet absorber, a pigment, a catalyst, a rheology modifier, and wax.

Examples of the "antioxidant" include a phenol-based antioxidant, a phosphite-based antioxidant, a thioether-based antioxidant, and an amine-based antioxidant. Examples of the "plasticizer" include a phthalate-based plasticizer, an alkylsulfonate-based plasticizer, an adipate-based plasticizer, an acetate-based plasticizer, and a phosphate-based plasticizer.

Examples of the "ultraviolet absorber" include benzotriazole, hindered amine, benzoate, and benzotriazole.

Examples of the "pigment" include carbon black and titanium oxide.

Examples of the "catalyst" include a tin-based catalyst, a bismuth-based catalyst, and an amine-based catalyst.

Examples of the "wax" include a wax such as paraffin wax and microcrystalline wax.

Examples of a method for using the hot melt adhesive of the present invention include a method of heating the hot melt adhesive of the present invention to 100 to 150° C. to melt the same and applying the molten adhesive to an adherend (for example, a first member and/or a second member). The material of the second member may be the same as or different from that of the first member. The method further includes joining the first member and the second member to form a joined body or a laminate and curing the adhesive utilizing the moisture in the air under the condition of room temperature (about 20° C. to 25° C.). Various applicators can be used when the hot melt adhesive of the present invention is applied to the adherend.

Examples of the adherend to which the composition of the present invention can be applied include plastics (for example, polyolefins such as polypropylene; polycarbonate; and acrylic resin), wood, rubber, glass, and metal. Preferred embodiments include using the composition of the present invention for the adhesion of polycarbonate resins or acrylic resins; and for the adhesion between a polycarbonate resin or an acrylic resin and polypropylene.

The moisture-curable hot melt adhesive according to the present invention can be utilized as a sealing material for industrial use, for example, for sealing electronic/electrical components, automobile parts, vehicle parts and the like, and is preferably used for lighting appliances. The present invention relates also to a lighting appliance produced using the above moisture-curable hot melt adhesive. Examples of the lighting appliance include a lighting appliance for motor vehicles (for example, a head lamp and a rear combination lamp) and a lighting appliance for two-wheeled vehicles (such as motorcycles).

When the adhesive is used for a lighting appliance for motor vehicles, the composition of the present invention can be used for the sealing (adhesion) between the lens and the housing of the lighting appliance for motor vehicles. When the hot melt adhesive of the present invention is used for the lighting appliance for motor vehicles, the materials of the lens and the housing are not particularly limited. Examples of the material of the lens that can be used include a transparent resin such as polycarbonate and an acrylic resin (for example, PMMA: polymethyl methacrylate resin) and glass. Examples of the material of the housing include polyolefins such as polypropylene. The housing may be subjected to plasma treatment. Since the lighting appliance of the present invention is produced using the above moisture-curable hot melt adhesive, for example, the inspection time after the lens and the housing of the lighting appliance for motor vehicles are bonded is reduced, and the lens part is not fogged.

Further, the hot melt adhesive of the present invention can be used for joining waterproof packing parts of household appliances such as washing machines, driers, and refrigerators.

The present invention also relates to a vehicle having a lighting appliance produced using the above moisture-curable hot melt adhesive. Since the vehicle of the present invention has a lighting appliance produced using the above moisture-curable hot melt adhesive, the lighting appliance is not peeled off by heat or impact and the lens is not fogged, thereby allowing safer travelling. The vehicle according to the present invention is not particularly limited as long as it has the above lighting appliance. Specific examples of the vehicle include vehicles according to the Road Traffic Law such as railroad vehicles such as an electric railcar, a railroad car and a train, military vehicles such as a tank and an armored car, motor vehicles, motor bicycles (motorcycles), buses, and streetcars.

EXAMPLES

Hereinafter, the present invention will be described with reference to Examples and Comparative Examples, but these examples are for describing the present invention and do not limit the present invention at all.

Example 1

As shown in Table 1,
23 g of polyethylene glycol (trade name: PEG2000, number average molecular weight: 2000, hydroxyl value: 56 mgKOH/g, manufactured by NOF CORPORATION),
20 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
18 g of general-purpose polyester polyol (trade name: HS 2H-351A, melting point: 55° C., number average molecular weight: 2000, hydroxyl value: 32 mgKOH/g, manufactured by HOKOKU Co., Ltd.),
24 g of bead-like thermoplastic polyacrylic resin (trade name: DIANAL BR-87, weight average molecular weight: 25000, glass transition temperature: 105° C., manufactured by Mitsubishi Rayon Co., Ltd.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 10.4 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 2

As shown in Table 1,
23 g of polyethylene glycol (trade name: PEG2000, number average molecular weight: 2000, hydroxyl value: 56 mgKOH/g, manufactured by NOF CORPORATION),
20 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
8 g of general-purpose polyester polyol (trade name: HS 2H-351A, melting point: 55° C., number average molecular weight: 2000, hydroxyl value: 32 mgKOH/g, manufactured by HOKOKU Co., Ltd.),
16 g of bead-like thermoplastic polyacrylic resin (trade name: DIANAL BR-87, weight average molecular weight: 25000, glass transition temperature: 105° C., manufactured by Mitsubishi Rayon Co., Ltd.),
10 g of high-melting polyester polyol (trade name: Dynacoll 7390, melting point: 118° C., hydroxyl value: 30 mgKOH/g, manufactured by Evonik Industries AG),
8 g of acrylic polyol (trade name: ELVACITE 2901, glass transition point: 75° C., hydroxyl value: 6.5 mgKOH/g, number average molecular weight: 43000, manufactured by Lucite International, Inc.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 10.4 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 3

As shown in Table 1,
10 g of polyethylene glycol (trade name: PEG2000, number average molecular weight: 2000, hydroxyl value: 56 mgKOH/g, manufactured by NOF CORPORATION),
10 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
23 g of polyoxyethylene-oxypropylene block copolymer diol (SANNIX PL-2100, ethylene oxide content: 10%, hydroxyl value: 44 mgKOH/g, manufactured by Sanyo Chemical Industries),
8 g of general-purpose polyester polyol (trade name: HS 2H-351A, melting point: 55° C., number average molecular weight: 2000, hydroxyl value: 32 mgKOH/g, manufactured by HOKOKU Co., Ltd.),
16 g of bead-like thermoplastic polyacrylic resin (trade name: DIANAL BR-87, weight average molecular weight: 25000, glass transition temperature: 105° C., manufactured by Mitsubishi Rayon Co., Ltd.),
10 g of high-melting polyester polyol (trade name: Dynacoll 7390, melting point: 118° C., hydroxyl value: 30 mgKOH/g, manufactured by Evonik Industries AG),
8 g of acrylic polyol (trade name: ELVACITE 2901, glass transition point: 75° C., hydroxyl value: 6.5 mgKOH/g, number average molecular weight: 43000, manufactured by Lucite International, Inc.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 10.4 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 4

As shown in Table 1,
10 g of polyethylene glycol (trade name: PEG2000, number average molecular weight: 2000, hydroxyl value: 56 mgKOH/g, manufactured by NOF CORPORATION),
10 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
23 g of polyoxyethylene-oxypropylene block copolymer diol (SANNIX PL-2100, ethylene oxide content: 10%, hydroxyl value: 44 mgKOH/g, manufactured by Sanyo Chemical Industries),
8 g of general-purpose polyester polyol (trade name: HS 2H-351A, melting point: 55° C., number average molecular weight: 2000, hydroxyl value: 32 mgKOH/g, manufactured by HOKOKU Co., Ltd.),
16 g of bead-like thermoplastic polyacrylic resin (trade name: DIANAL BR-87, weight average molecular weight: 25000, glass transition temperature: 105° C., manufactured by Mitsubishi Rayon Co., Ltd.),
10 g of high-melting polyester polyol (trade name: Dynacoll 7390, melting point: 118° C., hydroxyl value: 30 mgKOH/g, manufactured by Evonik Industries AG),
6 g of acrylic polyol (trade name: ELVACITE 2901, glass transition point: 75° C., hydroxyl value: 6.5 mgKOH/g, number average molecular weight: 43000, manufactured by Lucite International, Inc.),
2 g of polycaprolactone polyol (trade name: CAPA6400, number average molecular weight: 37000, melting point: 59° C., manufactured by Perstorp Japan Co., Ltd.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 9.5 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 5

As shown in Table 1,
10 g of polyethylene glycol (trade name: PEG2000, number average molecular weight: 2000, hydroxyl value: 56 mgKOH/g, manufactured by NOF CORPORATION),
10 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
23 g of polyoxyethylene-oxypropylene block copolymer diol (SANNIX PL-2100, ethylene oxide content: 10%, hydroxyl value: 44 mgKOH/g, manufactured by Sanyo Chemical Industries),
6 g of general-purpose polyester polyol (trade name: HS 2H-351A, melting point: 55° C., number average molecular weight: 2000, hydroxyl value: 32 mgKOH/g, manufactured by HOKOKU Co., Ltd.),
16 g of bead-like thermoplastic polyacrylic resin (trade name: DIANAL BR-87, weight average molecular weight: 25000, melting point: 105° C., manufactured by Mitsubishi Rayon Co., Ltd.),
10 g of high-melting polyester polyol (trade name: Dynacoll 7390, melting point: 118° C., hydroxyl value: 32 mgKOH/g, manufactured by Evonik Industries AG),
8 g of acrylic polyol (trade name: ELVACITE 2901, glass transition point: 75° C., hydroxyl value: 6.5 mgKOH/g, number average molecular weight: 43000, manufactured by Lucite International, Inc.),
2 g of polycaprolactone polyol (trade name: CAPA6400, number average molecular weight: 37000, melting point: 59° C., manufactured by Perstorp Japan Co., Ltd.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 9.3 g of isocyanate compound (4,4'-diphenylmethane diisocyanate, trade name: Millionate MT-F), and the resulting mixture was further stirred at a temperature of 120° C. under reduced pressure for 1 hour; to the mixture was added 0.3 g of secondary aminosilane Dynasylan 1189, and the resulting mixture was further stirred at a temperature of 120° C. under reduced pressure for 30 minutes; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 6

As shown in Table 1,
23 g of polyethylene glycol (trade name: PEG2000, number average molecular weight: 2000, hydroxyl value: 56 mgKOH/g, manufactured by NOF CORPORATION),
20 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
8 g of general-purpose polyester polyol (trade name: HS 2H-351A, melting point: 55° C., number average molecular weight: 2000, hydroxyl value: 32 mgKOH/g, manufactured by HOKOKU Co., Ltd.),
16 g of bead-like thermoplastic polyacrylic resin (trade name: DIANAL BR-87, weight average molecular weight: 25000, glass transition temperature: 105° C., manufactured by Mitsubishi Rayon Co., Ltd.),
10 g of high-melting polyester polyol (trade name: HS 2H-359T, melting point: 110° C., hydroxyl value: 32 mgKOH/g, manufactured by HOKOKU Co., Ltd.),
8 g of acrylic polyol (trade name: ELVACITE 2901, glass transition point: 75° C., hydroxyl value: 6.5 mgKOH/g, number average molecular weight: 43000, manufactured by Lucite International, Inc.), and
0.25 g of hindered phenol antioxidant (trade name: ADEKA STAB AO-50, manufactured by ADEKA CORPORATION)

were heated with stirring under reduced pressure for 2 hours to obtain a mixture. Water was removed from the mixture, and then to the resulting mixture was added 10.4 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 7

As shown in Table 1,
23 g of polyethylene glycol (trade name: PEG2000, number average molecular weight: 2000, hydroxyl value: 56 mgKOH/g, manufactured by NOF CORPORATION),
20 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
8 g of general-purpose polyester polyol (trade name: HS 2H-351A, melting point: 55° C., number average molecular weight: 2000, hydroxyl value: 32 mgKOH/g, manufactured by HOKOKU Co., Ltd.),
16 g of bead-like thermoplastic polyacrylic resin (trade name: DIANAL BR-87, weight average molecular weight: 25000, glass transition temperature: 105° C., manufactured by Mitsubishi Rayon Co., Ltd.),
10 g of high-melting polyester polyol (trade name: Dynacoll 7340, melting point: 96° C., hydroxyl value: 30 mgKOH/g, manufactured by Evonik Industries AG),
8 g of acrylic polyol (trade name: ELVACITE 2901, glass transition point: 75° C., hydroxyl value: 6.5 mgKOH/g, number average molecular weight: 43000, manufactured by Lucite International, Inc.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 10.4 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 8

As shown in Table 1,
23 g of polyethylene glycol (trade name: PEG2000, number average molecular weight: 2000, hydroxyl value: 56 mgKOH/g, manufactured by NOF CORPORATION),
20 g of polypropylene glycol (trade name: HIFLEX D2000, number average molecular weight: 2000, hydroxyl value: 56 mgKOH/g, manufactured by Dai-Ichi Kogyo Seiyaku Co., Ltd.), 8 g of general-purpose polyester polyol (trade name: HS 2H-351A, melting point: 55° C., number average molecular weight: 2000, hydroxyl value: 32 mgKOH/g, manufactured by HOKOKU Co., Ltd.),
16 g of bead-like thermoplastic polyacrylic resin (trade name: DIANAL BR-87, weight average molecular weight: 25000, glass transition temperature: 105° C., manufactured by Mitsubishi Rayon Co., Ltd.),
10 g of high-melting polyester polyol (trade name: Dynacoll 7330, melting point: 85° C., hydroxyl value: 30 mgKOH/g, manufactured by Evonik Industries AG), and
8 g of acrylic polyol (trade name: ELVACITE 2901, glass transition point: 75° C., hydroxyl value: 6.5 mgKOH/g, number average molecular weight: 43000, manufactured by Lucite International, Inc.)
were heated with stirring under reduced pressure for 2 hours to obtain a mixture. Water was removed from the mixture, and then to the resulting mixture was added 10.4 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Example 9

As shown in Table 1,
23 g of polyethylene glycol (trade name: PEG2000, number average molecular weight: 2000, hydroxyl value: 56 mgKOH/g, manufactured by NOF CORPORATION),
20 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
18 g of general-purpose polyester polyol (trade name: HS 2H-351A, melting point: 55° C., number average molecular weight: 2000, hydroxyl value: 32 mgKOH/g, manufactured by HOKOKU Co., Ltd.),
24 g of bead-like thermoplastic polyacrylic resin (trade name: DIANAL MB-2389, weight average molecular weight: 30000, glass transition temperature: 90° C., manufactured by Mitsubishi Rayon Co., Ltd.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 10.4 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

Comparative Example 1

As shown in Table 2,
19 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
20 g of general-purpose polyester polyol (trade name: HS 2H-351A, melting point: 55° C., number average molecular weight: 2000, hydroxyl value: 32 mgKOH/g, manufactured by HOKOKU Co., Ltd.),
20 g of general-purpose polyester polyol (trade name: ETERNACOLL 3010, melting point: 72° C., number average molecular weight: 3500, hydroxyl value: 32 mgKOH/g, manufactured by Ube Industries, Ltd.),
16 g of thermoplastic polyacrylic resin (trade name: DIANAL BR-116, weight average molecular weight: 45000, glass transition temperature: 50° C., manufactured by Mitsubishi Rayon Co., Ltd.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 9.3 g of isocyanate compound (4,4'-diphenylmethane diisocyanate, trade name: Millionate MT-F), and the resulting mixture was further stirred at a temperature of 120° C. under reduced pressure for 2 hours to obtain a moisture-curable hot melt adhesive.

Comparative Example 2

As shown in Table 2,
40 g of polytetramethylene ether glycol (trade name: PTMG2000, number average molecular weight: 2000, hydroxyl value: 56 mgKOH/g, manufactured by Mitsubishi Chemical Corporation),
60 g of general-purpose polyester polyol (trade name: HS 2H-351A, melting point: 55° C., number average molecular weight: 2000, hydroxyl value: 32 mgKOH/g, manufactured by HOKOKU Co., Ltd.),
0.5 g of Fischer-Tropsch wax (trade name: Sasol Wax C80, melting point: 88° C., Sasol Wax Corporation) and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 15.9 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was dropwise added 0.2 g of catalyst DMDEE (2,2'-dimorpholinodiethyl ether), and the resulting mixture was further stirred at a temperature of 120° C. under reduced pressure for 30 minutes to obtain a moisture-curable hot melt adhesive.

Comparative Example 3

As shown in Table 2,
55 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
45 g of general-purpose polyester polyol (trade name: HS 2H-351A, melting point: 55° C., number average molecular weight: 2000, hydroxyl value: 32 mgKOH/g, manufactured by HOKOKU Co., Ltd.), and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 17.3 g of isocyanate compound (4,4'-diphenylmethane diisocyanate, trade name: Millionate MT-F), and the resulting mixture was further stirred at a temperature of 120° C. under reduced pressure for 2 hours to obtain a moisture-curable hot melt adhesive.

Comparative Example 4

As shown in Table 2,
23 g of polyethylene glycol (trade name: PEG2000, number average molecular weight: 2000, hydroxyl value: 56 mgKOH/g, manufactured by NOF CORPORATION),
20 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
18 g of general-purpose polyester polyol (trade name: HS 2H-351A, melting point: 55° C., number average molecular weight: 2000, hydroxyl value: 32 mgKOH/g, manufactured by HOKOKU Co., Ltd.),
24 g of terpene phenol tackifier (trade name: TAMANOL 901, softening point: 130° C., hydroxyl value: 40 mgKOH/g, manufactured by Arakawa Chemical Industries, Ltd.) and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 15.1 g of isocyanate compound (4,4'-diphenylmethane diisocyanate, trade name: Millionate MT-F), and the resulting mixture was further stirred at a temperature of 120° C. under reduced pressure for 2 hours to obtain a moisture-curable hot melt adhesive.

Comparative Example 5

As shown in Table 2,
55 g of polypropylene glycol (trade name: HIFLEX D2000, number average molecular weight: 2000, hydroxyl value: 56 mgKOH/g, manufactured by Dai-Ichi Kogyo Seiyaku Co., Ltd.),
45 g of general-purpose polyester polyol (trade name: HS 2H-351A, melting point: 55° C., number average molecular weight: 2000, hydroxyl value: 32 mgKOH/g, manufactured by HOKOKU Co., Ltd.) and
0.25 g of hindered phenol antioxidant (trade name: ADEKA STAB AO-50, manufactured by ADEKA CORPORATION) were heated with stirring under reduced pressure for 2 hours to obtain a mixture. Water was removed from the mixture, and then to the resulting mixture was added 17.3 g of isocyanate compound (4,4'-diphenylmethane diisocyanate, trade name: Millionate MT-F), and the resulting mixture was further stirred at a temperature of 120° C. under reduced pressure for 1.5 hours; and to the mixture was added 1.2 g of oxazolidine compound (HARDENER OZ, manufactured by Sumika Bayer Urethane Co., Ltd.), and the resulting mixture was further stirred at a temperature of 120° C. for 30 minutes to obtain a moisture-curable hot melt adhesive.

The abbreviations of the compounds used in Tables will be shown below.
(a1) Polyol compound
(a1-1) Polyethylene glycol (trade name: PEG2000, number average molecular weight: 2000, hydroxyl value: 56 mgKOH/g, manufactured by NOF CORPORATION)
(a1-2) Polypropylene glycol (trade name: HIFLEX D2000, number average molecular weight: 2000, hydroxyl value: 56 mgKOH/g, manufactured by Dai-Ichi Kogyo Seiyaku Co., Ltd.)
(a1-3) Polyoxyethylene-oxypropylene block copolymer diol (SANNIX PL-2100, ethylene oxide content: 10%, hydroxyl value: 44 mgKOH/g, manufactured by Sanyo Chemical Industries)
(a1-4) Polytetramethylene ether glycol (trade name: PTMG2000, number average molecular weight: 2000, hydroxyl value: 56 mgKOH/g, manufactured by Mitsubishi Chemical Corporation)

(a1-5) Polyester polyol (trade name: HS 2H-351A, melting point: 55° C., number average molecular weight: 2000, hydroxyl value: 32 mgKOH/g, manufactured by HOKOKU Co., Ltd.)
(a1-6) Polyester polyol (trade name: ETERNACOLL 3010, melting point: 72° C., number average molecular weight: 3500, hydroxyl value: 32 mgKOH/g, manufactured by Ube Industries, Ltd.)
(a1-7) High-melting polyester polyol (trade name: Dynacoll 7390, number average molecular weight: 3500, melting point: 118° C., hydroxyl value: 30 mgKOH/g, manufactured by Evonik Industries AG)
(a1-8) High-melting polyester polyol (trade name: HS 2H-359T, number average molecular weight: 3500, melting point: 110° C., hydroxyl value: 32 mgKOH/g, manufactured by HOKOKU Co., Ltd.)
(a1-9) High-melting polyester polyol (trade name: Dynacoll 7340, number average molecular weight: 3500, melting point: 96° C., hydroxyl value: 30 mgKOH/g, manufactured by Evonik Industries AG)
(a1-10) High-melting polyester polyol (trade name: Dynacoll 7330, number average molecular weight: 3500, melting point: 85° C., hydroxyl value: 30 mgKOH/g, manufactured by Evonik Industries AG)
(a1-11) Polycaprolactone polyol (trade name: CAPA6400, number average molecular weight: 37000, melting point: 59° C., hydroxyl value: 4 mgKOH/g, manufactured by Perstorp Japan Co., Ltd.)
(a1-12) Acrylic polyol (trade name: ELVACITE 2901, glass transition point: 75° C., hydroxyl value: 6.5 mgKOH/g, number average molecular weight: 43000, manufactured by Lucite International, Inc.)

(a2) Isocyanate compound
(a2-1) 4,4'-diphenylmethane diisocyanate (trade name: Millionate MT-F)
(b) Thermoplastic polyacrylic resin
(b1) Bead-like thermoplastic polyacrylic resin (trade name: DIANAL BR-87, weight average molecular weight: 25000, glass transition temperature: 105° C., manufactured by Mitsubishi Rayon Co., Ltd.)
(b2) Bead-like thermoplastic polyacrylic resin (trade name: DIANAL MB-2389, weight average molecular weight: 30000, glass transition temperature: 90° C., manufactured by Mitsubishi Rayon Co., Ltd.)
(b3) Thermoplastic polyacrylic resin (trade name: DIANAL BR-116, weight average molecular weight: 45000, glass transition temperature: 50° C., manufactured by Mitsubishi Rayon Co., Ltd.)
(c) Oxazolidine compound
(c1) Oxazolidine compound (trade name: HARDENER OZ, manufactured by Sumika Bayer Urethane Co., Ltd.)
Antioxidant: Hindered phenol antioxidant (trade name: ADEKA STAB AO-50, manufactured by ADEKA CORPORATION)
Tackifier: Terpene phenol resin (trade name: TAMANOL 901, softening point: 130° C., hydroxyl value: 40 mgKOH/g, manufactured by Arakawa Chemical Industries, Ltd.)
Waxes: Fischer-Tropsch wax (trade name: Sasol Wax C80, melting point: 88° C., Sasol Wax Corporation)
Catalyst: DMDEE (2,2'-dimorpholinodiethyl ether)
Silane compound: Secondary aminosilane (trade name: Dynasylan1189, manufactured by Evonik Industries AG)

TABLE 1

| Material | Example 1 | 2 | 3 | 4 | 5 | 6 | 7 | 8 | 9 |
|---|---|---|---|---|---|---|---|---|---|
| Polyol compound | | | | | | | | | |
| (a1-1) | 23 | 23 | 10 | 10 | 10 | 23 | 23 | 23 | 23 |
| (a1-2) | 20 | 20 | 10 | 10 | 10 | 20 | 20 | 20 | 20 |
| (a1-3) | | | 23 | 23 | 23 | | | | |
| (a1-4) | | | | | | | | | |
| (a1-5) | 18 | 8 | 8 | 8 | 6 | 8 | 8 | 8 | 18 |
| (a1-6) | | | | | | | | | |
| (a1-7) | | 10 | 10 | 10 | 10 | | | | |
| (a1-8) | | | | | | 10 | | | |
| (a1-9) | | | | | | | 10 | | |
| (a1-10) | | | | | | | | 10 | |
| (a1-11) | | | | 2 | 2 | | | | |
| (a1-12) | | 8 | 8 | 6 | 8 | 8 | 8 | 8 | |
| Thermoplastic polyacrylic resin | | | | | | | | | |
| (b1) | 24 | 16 | 16 | 16 | 16 | 16 | 16 | 16 | |
| (b2) | | | | | | | | | 24 |
| (b3) | | | | | | | | | |
| Antioxidant | 0.25 | 0.25 | 0.25 | 0.25 | 0.25 | 0.25 | 0.25 | 0.25 | 0.25 |
| Tackifier | | | | | | | | | |
| Waxes | | | | | | | | | |
| Isocyanate compound | | | | | | | | | |
| (a2-1) | 10.4 | 10.4 | 10.4 | 9.5 | 9.3 | 10.4 | 10.4 | 10.4 | 10.4 |
| Oxazolidine compound | | | | | | | | | |
| (c1) | 1.2 | 1.2 | 1.2 | 1.2 | 1.2 | 1.2 | 1.2 | 1.2 | 1.2 |
| Catalyst | | | | | | | | | |
| Silane compound | | | | | 0.3 | | | | |

In the table, unit of figures is indicated in "g" for formulation (blending) of hot melt adhesives.

TABLE 2

| Material | Comparative Example | | | | |
|---|---|---|---|---|---|
| | 1 | 2 | 3 | 4 | 5 |
| Polyol compound | | | | | |
| (a1-1) | | | | 23 | |
| (a1-2) | 19 | | 55 | 20 | 55 |
| (a1-3) | | | | | |
| (a1-4) | | 40 | | | |
| (a1-5) | 20 | 60 | 45 | 18 | 45 |
| (a1-6) | 20 | | | | |
| (a1-7) | | | | | |
| (a1-8) | | | | | |
| (a1-9) | | | | | |
| (a1-10) | | | | | |
| (a1-11) | | | | | |
| (a1-12) | | | | | |
| Thermoplastic polyacrylic resin | | | | | |
| (b1) | | | | | |
| (b2) | | | | | |
| (b3) | 24 | | | | |
| Antioxidant | 0.25 | 0.25 | 0.25 | 0.25 | 0.25 |
| Tackifier | | | | 24 | |
| Waxes | | 0.5 | | | |
| Isocyanate compound | | | | | |
| (a2-1) | 9.3 | 15.9 | 17.3 | 15.1 | 17.3 |
| Oxazolidine compound | | | | | |
| (c1) | | | | | 1.2 |
| Catalyst | | 0.2 | | | |
| Silane compound | | | | | |

In the table, unit of figures is indicated in "g" for formulation (blending) of hot melt adhesives.

A button-sagging test was performed in order to evaluate initial sagging resistance and effusion resistance of moisture-curable hot melt adhesives produced in Examples and Comparative Examples. Further, viscosity and thermal stability were measured in order to evaluate coating performance. Shear adhesive strength was evaluated as a test of adhesive properties. Further, fogging resistance was evaluated as an evaluation of fogging due to volatile matter. As an evaluation of prevention of volume expansion, measurement of film thickness change and bubble observation test were performed. Each test method and evaluation criteria will be described below.

Viscosity Measurement

The measurement was performed with a rotational viscometer manufactured by Brookfield Company. Each adhesive of Examples and Comparative Examples was melted at 120° C. for 45 minutes; a predetermined amount (10.5 g or more) of the molten moisture-curable hot melt adhesive was poured into a viscosity tube; a spindle was attached to the viscometer; the spindle was rotated; and the minimum value after heating to 120° C. was defined as the initial value. No. 27 rotor was used for the viscosity measurement at 120° C. The results obtained as the initial values are shown in Table 3 as the viscosity.

Thermal Stability Measurement

The measurement was performed in the same manner as in the viscosity measurement using a rotational viscometer manufactured by Brookfield Company placed in an atmosphere of 23° C. and 50% RH. Each adhesive of Examples and Comparative Examples was melted at 120° C. for 45 minutes; a predetermined amount (10.5 g or more) of the molten moisture-curable hot melt adhesive was poured into a viscosity tube; a spindle was attached to the viscometer; the spindle was rotated; and the minimum value after heating to 120° C. was defined as the initial value. The viscosity measurement was continued after the measurement of the viscosity initial value at 120° C., and a value 90 minutes after the measurement of the initial value was defined as a 90-minute value. The rate of thickening for 90 minutes was defined as thermal stability, which was calculated as follows. The results are shown in Table 3.

Thermal stability (%)=(90-minute value−initial value)×100/(initial value)

Button-Sagging Test

The moisture-curable hot melt adhesives of Examples and Comparative Examples were previously melted at 120° C. for 45 minutes, and the molten moisture-curable hot melt adhesive was poured into a hole of a fixture made of Teflon (registered trademark) or silicone which was placed on a polycarbonate sheet. The size of the circular hole of the fixture was 16 mm in diameter and 5 mm in thickness. After the moisture-curable hot melt adhesive was poured into the circular hole at the center of the fixture, the upper part was immediately covered with a commercially available aluminum foil and pressed with a stainless steel plate having a thickness of 1 mm so that the aluminum foil surface might be smooth.

After the moisture-curable hot melt adhesive was solidified, the fixture was immediately removed; the periphery of the aluminum foil was cut with scissors; and the test piece was placed in a constant temperature and humidity chamber set to a predetermined temperature and humidity. After the adhesive was cured under the temperature and humidity conditions described in Tables 4 and 5, the test piece was placed in a circulation heating oven with a tilt angle of 60 degrees, and the sagging and effusion of the adhesive in a circular shape were observed. The same test was performed for 3 test pieces for one type of hot melt adhesive. The conditions during curing, the atmosphere during measurement, and evaluation results are shown in Tables 4 and 5 for each Example and Comparative Example.

Evaluation Criteria of Button-Sagging Test

∘∘: Among the 3 test pieces, 3 test pieces showed a sagging of 2 mm or less and no effusion.

∘: Among the 3 test pieces, 3 test pieces showed a sagging and effusion of less than 10 mm.

Δ: Among the 3 test pieces, 1 test piece showed a sagging and effusion of 10 mm or more.

x: Among the 3 test pieces, 2 to 3 test pieces showed a sagging and effusion of 10 mm or more.

Shear Adhesive Strength Measurement

The moisture-curable hot melt adhesive melted at 120° C. was applied to a 2-mm thick polycarbonate sheet having a size of 25 mm in width×100 mm in length, and a test piece was prepared with an overlapping width of 10 mm. The gap between the two polycarbonate sheets was set to about 0.1 mm.

An overflowed adhesive was cut, and the test piece was cured for 8 days in an atmosphere of 23° C. and 50% RH. The test piece was set in a tensile testing machine, and the tensile test was performed at a stress rate of 100 mm/min to measure the maximum load. Adhesion stress (MPa) was calculated from the maximum load and the adhesive sectional area (25 mm in width×10 mm) to obtain shear adhesive strength.

Fogging Resistance Test

The moisture-curable hot melt adhesive melted at 120° C. was uniformly applied to a release paper and extended to a thickness of 2 mm with a bar coater. The release paper was removed 1 hour after applying the adhesive. Then, the adhesive sheet was cured for 7 days in an atmosphere of 23° C. and 50% RH. 3 grams of the cured adhesive was put into a 110-ml glass bottle (screw cap bottle No. 8, height: 120 mm, aperture diameter: 21 mm, central part outer diameter of glass bottle: 40 mm, manufactured by AS ONE Corporation), and the bottle was covered with a polycarbonate sheet, on which a weight was placed.

The glass bottle containing the adhesive, the polycarbonate sheet, and the weight were placed in an oil bath. The silicone oil in the oil bath was heated and checked for having reached 120° C., and then the oil bath was heated for 24 hours. After heating for 24 hours, the glass bottle, the polycarbonate sheet, and the weight were taken out from the oil bath and allowed to stand until room temperature is reached. Then, the weight was removed, and a deposit on the polycarbonate sheet was observed.

Evaluation Criteria of Fogging Resistance Test

The evaluation criteria of the fogging resistance test are as follows.

o: No deposit was observed on the polycarbonate sheet.
x: A deposit was observed on the polycarbonate sheet.

Measurement of the Rate of Film Thickness Change

The moisture-curable hot melt adhesive melted at 120° C. was uniformly applied to a release paper and extended to a thickness of 2 mm with a bar coater. The release paper was removed 1 hour after applying the adhesive. Then, the film thickness measurement of the adhesive sheet was performed to obtain the initial value. The adhesive sheet was cured for 7 days in an atmosphere of 23° C. and 50% RH. The adhesive sheet after curing was put into a 120° C. oven and heated for 1 hour. The heated adhesive sheet was cooled to room temperature and subjected to film thickness measurement to obtain a value after heating. The film thickness measurement was performed using a Peacock dial thickness gage G type (thickness measuring instrument).

Rate of film thickness change (%)=(value after heating−initial value)×100/(initial value)

Bubble Observation Test

The presence or absence of bubbles in a sheet was visually observed using a test piece for measuring the film thickness change. The evaluation was performed on an adhesive sheet (without heating) which was cured for 7 days in an atmosphere of 23° C. and 50% RH and an adhesive sheet (heating followed by cooling) which was cured for 7 days in an atmosphere of 23° C. and 50% RH, then heated at 120° C. for 1 hour, and then cooled to room temperature. A void having a diameter of 0.2 mm or more which can be visually determined was defined as a bubble, and a test piece having one or more bubbles per 1 cm$^2$ was determined to be "with bubble", and a test piece having zero bubble was determined to be "no bubble".

Tables 3 to 5 show the results of having performed the above test using the hot melt adhesives of Examples and Comparative Examples.

TABLE 3

| | Example | | | | | | | | |
|---|---|---|---|---|---|---|---|---|---|
| | 1 | 2 | 3 | 4 | 5 | 6 | 7 | 8 | 9 |
| Viscosity (mPa · s) | 17150 | 26000 | 23300 | 26750 | 33250 | 30900 | 27400 | 19250 | 24200 |
| Thermal stability (%/90 min) | 28.2 | 29.1 | 21.2 | 22.8 | 30.0 | 28.7 | 27.0 | 30.0 | 29.8 |

| | Comparative Example | | | | |
|---|---|---|---|---|---|
| | 1 | 2 | 3 | 4 | 5 |
| Viscosity (mPa · s) | 12500 | 12400 | 3000 | 950 | 1850 |
| Thermal stability (%/90 min) | 2.0 | 50.0 | 25.0 | 21.1 | 24.3 |

TABLE 4

| | | Example | | | | | | | | |
|---|---|---|---|---|---|---|---|---|---|---|
| | | 1 | 2 | 3 | 4 | 5 | 6 | 7 | 8 | 9 |
| Button-sagging test | | | | | | | | | | |
| Curing condition | Measurement atmosphere | | | | | | | | | |
| 10° C., 40% RH * 7 days | 115° C. * 24 h | o | oo | oo | oo | oo | oo | oo | o | o |
| 23° C., 50% RH * 3 hrs | 110° C. * 24 h | oo | oo | oo | oo | oo | oo | o | o | o |
| 23° C., 50% RH * 4 hrs | 115° C. * 24 h | oo | oo | oo | oo | oo | oo | o | o | o |

TABLE 4-continued

|  | Example | | | | | | | | |
|---|---|---|---|---|---|---|---|---|---|
|  | 1 | 2 | 3 | 4 | 5 | 6 | 7 | 8 | 9 |
| 23° C., 50% RH * 115° C. * 24 h 5 hrs | ○○ | ○○ | ○○ | ○○ | ○○ | ○○ | ○○ | ○○ | ○○ |
| Shear adhesive strength (MPa) | 5.6 | 5.8 | 9.2 | 6.4 | 5.7 | 8.7 | 7.7 | 8.9 | 6.1 |
| Fogging resistance test (evaluation) | ○ | ○ | ○ | ○ | ○ | ○ | ○ | ○ | ○ |
| Bubble observation test (no heating) | none | none | none | none | none | none | none | none | none |
| Bubble observation test (with heating and cooling) | none | none | none | none | none | none | none | none | none |
| Film thickness change (%) | 0 | 0 | 0 | 0 | 0 | 0 | 0 | 0 | 0 | none: no bubble was observed in Bubble observation test
exist: bubbles were observed in Bubble observation test

TABLE 5

|  | | Comparative Example | | | | |
|---|---|---|---|---|---|---|
|  | | 1 | 2 | 3 | 4 | 5 |
| Button-sagging test | | | | | | |
| Curing condition | Measurement atmosphere | | | | | |
| 10° C., 40% RH * 7 days | 115° C. * 24 h | x | Δ | x | x | x |
| 23° C., 50% RH * 3 hrs | 110° C. * 24 h | x | ○ | x | x | x |
| 23° C., 50% RH * 4 hrs | 115° C. * 24 h | x | ○○ | x | x | x |
| 23° C., 50% RH * 5 hrs | 115° C. * 24 h | x | ○○ | x | x | x |
| Shear adhesive strength (MPa) | | 2.5 | 3.4 | 3.8 | 4.3 | 4.0 |
| Fogging resistance test (evaluation) | | ○ | x | x | x | ○ |
| Bubble observation test (no heating) | | exist | none | none | exist | none |
| Bubble observation test (with heating and cooling) | | exist | exist | exist | exist | none |
| Film thickness change (%) | | 4.8 | 3.3 | 12.3 | 15.3 | 1.5 | none: no bubble was observed in Bubble observation test
exist: bubbles were observed in Bubble observation test As shown in Tables 3 to 5, the moisture-curable hot melt adhesives of Examples 1 to 9 are very excellent because these adhesives have low initial sagging and effusion by the button-sagging test. Further, the moisture-curable hot melt adhesives of Examples 1 to 9 have a melt viscosity of 17,000 to 34,000 mPa·s, which is higher than those of Comparative Examples 1 to 5 and can prevent sagging during coating even in an inclined part. Furthermore, since the moisture-curable hot melt adhesives of Examples 1 to 9 have a thermal stability within 30%, a significant viscosity increase or the like by coating is not observed.

The moisture-curable hot melt adhesives of Examples 1 to 9 are excellent also in the shear adhesive strength to polycarbonate resin. Further, the moisture-curable hot melt adhesives of Examples 1 to 9 have high fogging resistance, and have a feature in which the fogging by heating does not occur. The moisture-curable hot melt adhesives of Examples 1 to 9 have little volume change during heating and do not produce bubbles. Therefore, it has been shown that the moisture-curable hot melt adhesive of the present invention is particularly suitable for lighting appliances.

INDUSTRIAL APPLICABILITY

The present invention provides a moisture-curable hot melt adhesive for lighting appliances. The moisture-curable hot melt adhesive for lighting appliances according to the present invention can be used for the adhesion of a lens and a housing for motor vehicle lighting appliances and the adhesion of a housing and a unit for electric equipment. Since the moisture-curable hot melt adhesive for lighting appliances of the present invention has reduced volume expansion and sagging and is excellent in fogging resistance, heat resistance, and initial adhesive strength, the adhesive does not cause a problem with an uncured part, satisfies the requirements of a heating test, a lighting test, a pressurization test and the like, and is suitable for quick shipment from a plant.

What is claimed is:

1. A moisture-curable hot melt adhesive for lighting appliances comprising:
    a partly silylated isocyanate functional urethane prepolymer obtained by reacting a polyol compound, an isocyanate compound and a silane compound,
    a thermoplastic polyacrylic resin and
    an oxazolidine compound, wherein the oxazolidine compound is selected from a compound having a single oxazolidine ring, a compound having one or more oxazolidine rings, a urethane bond-containing oxazolidine compound, an ester group-containing oxazolidine compound, an oxazolidine silyl ether, a carbonate group-containing oxazolidine, 2-isopropyl-3-(2-hydroxyethyl)oxazolidine, 2-(1-methylbutyl)-3-(2-hydroxyethyl)oxazolidine, 3-(2-hydroxyethyl)-2-(1-methylbutyl)oxazolidine, 2-phenyl-3-(2-hydroxyethyl) oxazolidine and combinations thereof.

2. The moisture-curable hot melt adhesive for lighting appliance according to claim 1, wherein the polyol compound comprises both an acrylic polyol and a polyester polyol.

3. The moisture-curable hot melt adhesive for lighting appliances according to claim 1, wherein the polyol compound comprises a polyoxyethylene-oxypropylene block copolymer diol.

4. The moisture-curable hot melt adhesive for lighting appliances according to claim 1, wherein the polyol compound comprises a polycaprolactone polyol.

5. A lighting appliance comprising cured reaction products of the moisture-curable hot melt adhesive for lighting appliances according to claim 1.

6. A vehicle comprising the lighting appliance according to claim 5.

7. The moisture-curable hot melt adhesive for lighting appliances according to claim 1, wherein the silane compound is a secondary aminosilane.

8. The moisture-curable hot melt adhesive for lighting appliance according to claim 1, wherein the polyol compound comprises acrylic polyol, polyester polyol, and polyoxyethylene-oxypropylene block copolymer diol.

9. The moisture-curable hot melt adhesive for lighting appliance according to claim 1, wherein the polyol compound comprises acrylic polyol, polyester polyol, and polycaprolactone polyol.

10. The moisture-curable hot melt adhesive for lighting appliance according to claim 1, wherein the polyol compound comprises acrylic polyol, polyester polyol, polyoxyethylene-oxypropylene block copolymer diol, and polycaprolactone polyol.

11. The moisture-curable hot melt adhesive for lighting appliance according to claim 1, wherein the polyol compound comprises acrylic polyol, polyethylene glycol, polypropylene glycol and polyester polyol.

12. The moisture-curable hot melt adhesive for lighting appliance according to claim 1, wherein the polyol compound comprises polyethylene glycol, polypropylene glycol and polyester polyol.

13. The moisture-curable hot melt adhesive for lighting appliance according to claim 1, wherein the oxazolidine compound comprises a functional group selected from hydroxy, ester, silyl ether, carbonate, and combinations thereof.

14. A moisture-curable hot melt adhesive for lighting appliances consisting of:
an isocyanate functional urethane prepolymer that is the reaction product of a polyol compound, an isocyanate compound and a silane compound;
a thermoplastic polyacrylic resin;
an oxazolidine compound; and
optionally one or more additives selected from the group consisting of an antioxidant, a plasticizer, an ultraviolet absorber, a pigment, a catalyst, a rheology modifier, and wax.

15. The moisture-curable hot melt adhesive for lighting appliances according to claim 14, wherein the isocyanate functional urethane prepolymer is the reaction product of the polyol compound, the isocyanate compound and 0.1 to 0.5% of the silane compound by weight of the hot melt adhesive.

16. The moisture-curable hot melt adhesive for lighting appliances according to claim 14, wherein the isocyanate functional urethane prepolymer has isocyanate groups and methoxysilane groups.

* * * * *